United States Patent [19]
Kopaska

[11] 3,974,926
[45] Aug. 17, 1976

[54] BALED HAY TRANSPORTER

[76] Inventor: Larry A. Kopaska, Rte. 3, Guthrie Center, Iowa 50115

[22] Filed: June 10, 1974

[21] Appl. No.: 477,750

[52] U.S. Cl. .................................. 214/352; 214/144
[51] Int. Cl.² .......................................... E02F 3/00
[58] Field of Search .......... 214/766, 767, 776, 778, 214/144, 506, 501, 512, 352; 172/413; 280/43.11, 43.12, 43.17, 43.22, 43.23, 461 A, 479 R

[56] References Cited
UNITED STATES PATENTS

| | | | |
|---|---|---|---|
| 966,304 | 8/1910 | Bowman | 214/767 |
| 2,468,297 | 4/1949 | Jones | 214/352 |
| 2,621,942 | 12/1952 | Getz | 280/43.23 X |
| 2,652,939 | 9/1953 | Burch | 214/767 |
| 2,776,061 | 1/1957 | Dickmander | 214/766 X |
| 2,777,590 | 1/1957 | Moriarty | 214/766 |
| 2,791,340 | 5/1957 | Haines et al. | 214/766 X |
| 2,799,412 | 7/1957 | Pilch | 214/767 X |
| 3,013,677 | 12/1961 | Thompson | 214/506 X |
| 3,878,959 | 4/1975 | Holdeman et al. | 214/506 |

FOREIGN PATENTS OR APPLICATIONS

| | | | |
|---|---|---|---|
| 179,788 | 6/1962 | Sweden | 214/144 |

*Primary Examiner*—Albert J. Makay
*Attorney, Agent, or Firm*—Henderson, Strom and Sturm

[57] ABSTRACT

A baled hay transporter comprising structure rotatably mounted on a wheeled frame or cart for engaging the underside of baled hay and then rotatively lifting the baled hay in a cradling manner, portions of the rotative mechanism serving as part of the cradle mechanism.

6 Claims, 9 Drawing Figures

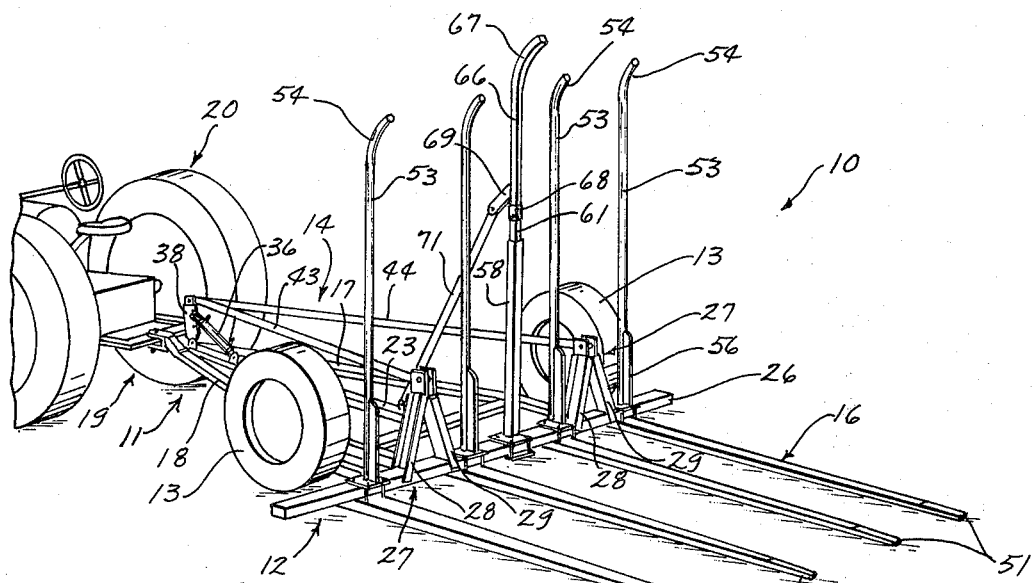

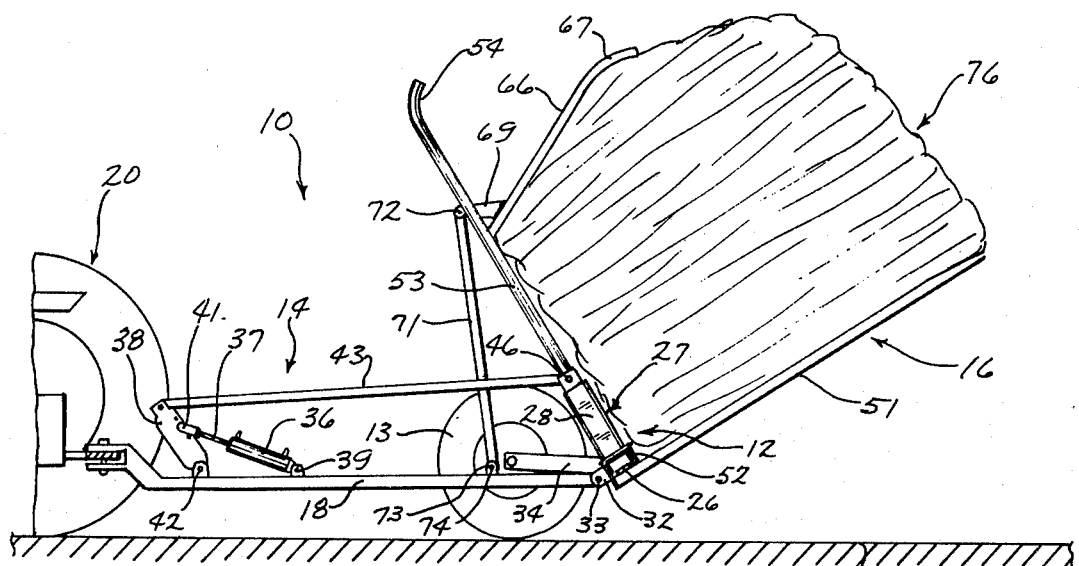
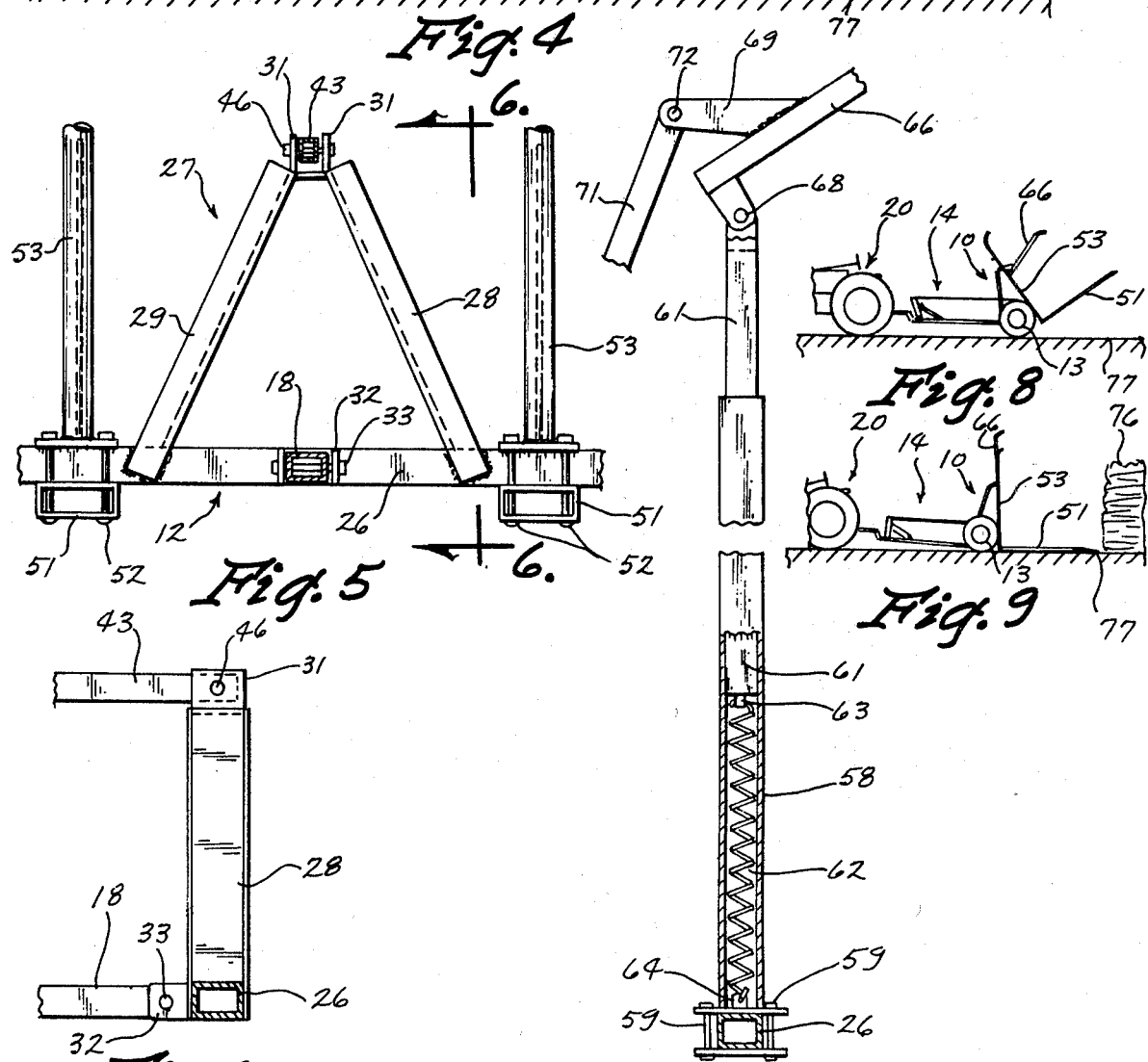

BALED HAY TRANSPORTER

BACKGROUND OF THE INVENTION

With the advent of the circular bale and the compressed right angular bale or stack of a size some 6 × 6 feet or greater, the transporting and stacking of these forms of hay require the development of farm machinery not known today.

The utilization of some conventional fork lift type movers has been attempted, these mounted on the standard threepoint hitch structure of certain tractors. Flexibility of the arrangement has been found wanting, however. Furthermore, counterweights must be added to the front of the tractor to compensate for the added rear weight.

Another system contemporary with the present invention comprises a wheeled cradling arrangement for picking up and moving a bale or stack, but without overhead hold-down or clamping provisions, and without proper under-support for the hay.

To the elimination of problems and objections of the aforementioned rather makeshift systems is the goal of the present invention.

SUMMARY OF THE INVENTION

The invention is an apparatus for transporting baled or compressed hay comprising a frame adapted to be towed, a crossbar structure pivotally mounted at the rear of the frame on a pair of wheels movable for transporting purposes and including bale backstop structures, hydraulically operated means for rotating the crossbar structure between a pair of positions, bale engaging means engaged with said crossbar structure and movable from a flat, ground engaging position to a raised cradle-type position in response to rotation of said crossbar structure to one position, and a clamping device automatically movable from an inoperative to an operative position in response to said crossbar structure rotation for picking up the baled hay.

It is an object of this invention to provide a new baled hay transporter.

It is further another object of this invention to provide a baled hay transporter including crossbar means to which bale-engaging means is secured, whereby movement of said crossbar means results in the bale-engaging means raising a hay bale from a normally ground engaging position to a raised position for transporting purposes.

It is still another object of this invention to provide a baled hay transporter capable of cradling the bale of hay during transport for efficient and effective transportation thereof.

Yet another object of this invention is to provide a baled hay transporter apparatus which includes a vertically movable overhead hold-down clamping device operable automatically in in response to lifting of a bale of hay to clamp down and engage the bale for secure transportation purposes.

Still another object of this invention is to provide a baled hay transporter which is easily manufactured, efficient in operation, and simple but rugged in structure.

These objects and other features and advantages of this invention will become more readily apparent upon reference to the following description, when taken into consideration with the accompanying drawings.

BRIEF DESCRIPTION OF THE DRAWINGS

FIG. 1 is a perspective view of a preferred embodiment of a baled hay transporter of this invention;

FIG. 2 is a plan view thereof;

FIG. 3 is a side elevational view thereof, showing the transporter backing into and below a bale of hay;

FIG. 4 is a view similar to FIG. 3, but wherein the hay has been lifted for transporting purposes;

FIG. 5 is a fragmentary sectional view taken along the line 5—5 in FIG. 2;

FIG. 6 is a fragmentary sectional view taken along the line 6—6 in FIG. 5;

FIG. 7 is a detail, elevational view partly in section of the hold-down device of the transporter;

FIG. 8 is a reduced schematic view showing the transporter in transport position; and FIG. 9 is a reduced schematic view showing the transporter in position prior to loading a bale of hay.

DESCRIPTION OF THE PREFERRED EMBODIMENT

Referring now to the drawings, a preferred embodiment of the baled hay transporter of this invention is indicated generally at 10 in FIG. 1. The transporter comprises generally a frame assembly 11, a crossbar assembly 12, a set of wheel units 13, a power unit 14 fastened between the frame assembly 11 and the crossbar assembly 12 for pivotally raising and lowering a bale-engaging unit 16 which is pivotally connected to the crossbar assembly 12.

More specifically, the frame assembly 11 includes a pair of elongated, horizontally disposed side elements 17 and 18 which diverge from their front ends at which a tongue unit 19 is connected to the drawbar of a conventional prime mover, such as a tractor 20. The diverged rear end portions 21 and 22, respectively, of the side elements 17 and 18 are disposed in a parallel relationship, both also parallel to the longitudinal axis of the transporter 10. The frame assembly 11 includes further an elongated center bar 23 extended rearwardly from the junction of the side elements 17 and 18 to a connection with a transverse bar 24 which extends between junctions of side element 17 with rear portion 21, and of side element 18 with rear portion 22.

The crossbar assembly 12 includes a crossbar element 26 (FIGS. 1 and 2) which has a length at least twice that of the transverse bar 24, and which extends normal to the longitudinal axis of the transporter 10 and to the direction of travel of the transporter and prime mover 20. Mounted in laterally spaced relation upon the crossbar 26, as best shown in FIG. 1 are a pair of triangular units 27, disposed in an upstanding position. Each unit 27 includes a pair of angle irons 28 and 29 (FIG. 5) secured as by welding at their bottoms to the crossbar 26 and joined at their upper ends by a U-shaped member having a pair of upright ears 31. The crossbar assembly 12 includes further a pair of forwardly extended projections 32 (FIG. 3) to which the rear ends of the portions 21 and 22 are pivotally connected by pivots 33.

The wheel units 13 each include a forwardly extended arm 34 secured at its rear to the crossbar 26 in spaced relation at best shown in FIG. 2, and to which the axle 35 of each wheel 13 is connected at the outer end therof.

Referring particularly to FIGS. 1–4 inclusive, the power unit 14 of this invention comprises a conventional, double-acting hydraulic cylinder 36 connected by lines (not shown) leading to the tractor hydraulic system and which is controlled therefrom. The cylinder 36 includes a piston 37 connected in turn to a rock arm 38 (FIG. 3). The cylinder 36 is pivotally connected at 39 to the center bar 23 (FIG. 2), and the piston 37 thereof is pivotally connected at 41 to the rock arm 38, with the latter being pivotally connected at its bottom at 42 to the center bar 23.

A pair of lift arms 43 and 44 (FIGS. 1 and 2) are joined at their front ends to the upper end of the rock arm 38 (FIG. 3) and extend rearwardly in a diverging manner to a connection at 46 to the upstanding ears 31 (FIG. 5) at the top of each triangular unit 27.

For the purpose of engaging and lifting a conventional bale 76 of hay from the ground 77 (FIG. 3) the bale-engaging unit 16 is provided. This unit comprises a plurality of elongated forks 51 (FIGS. 1 and 2), each of which is secured by a device 52 at its rear to the crossbar 26, such that all of the forks 51 extend rearwardly from the crossbar 26 in a parallel and straight manner, all of the forks 51 being disposed in a common normally horizontal plane as best shown in FIG. 3. Furthermore, the bale-engaging unit 16 includes a plurality of uprights 53, the uprights 53 also being secured to the crossbar 26 in spaced condition, actually the base 56 of each upright 53 being secured to the crossbar 26 by the same fastening device 52 as for the forks 51. The upper ends of the uprights 53 are curved at 54 in order to aid in holding the bale 76 particularly during transport position.

Also for the purpose of engaging and holding the bale 76 particularly during transport, a clamp unit is provided which includes a tubular member 58 secured at its base to the center of the crossbar 26 as best shown in FIG. 1. The bottom of the tube 58 is held by a fastener 59 (FIG. 7) to the crossbar 26. At the upper end of the tube 58, a post 61 is telescopically inserted therein, which post is retained in a normally down position by a spring 62 which is connected between a pair of eyelets 63 and 64 formed on the post 61 and fastener 59 respectively.

At the upper end of the post 61, an L-shaped clamp bar 66 having an outer curved end 67 (FIG. 1) is pivotally connected at 68. A connection 69 (FIG. 7) is secured as by welding to the clamp bars 66, and has a lift bar 71 pivotally connected thereto at 72, with the bottom of the lift bar 71 (FIG. 3) being pivotally connected at 73 to a projection 74 secured to the center bar 23 (FIG. 2).

In operation of the baled hay transporter 10, the bale-engaging unit 16 is held in a ground engaging position as best shown in FIG. 3 by operation of the cylinder 36, and while in that position is pushed rearwardly by movement of the tractor 20 such that the forks 51 slide underneath the bale 76 and on top of the ground 77 (see also FIG. 9). Movement of the tractor 20 continues until the uprights 53 engage the bale 76. In this condition, it will also be noted that the triangular units 27 also engage the bale 76 and serve as a part of the bale-engaging apparatus.

The cylinder 36 is then actuated to move the ground engaging unit 16 from its FIG. 3 position to the FIG. 4 position, wherein forward movement of both the rock arm 38 about its pivot 42 and the lift arms 43 and 44 cause the entire bale-engaging unit 16 to pivotally rotate about the pivots 33 (FIG. 3) in a counter-clockwise direction as viewed in FIGS. 3 and 4. In this manner, the bale 76 is cradled by the forks 51 and by the uprights 53 and the units 27.

Simultaneously with the rotation of the bale-engaging unit 16 in place, operation of the clamping unit causes the clamp bar 66 to move from its normal condition aligned with the uprights 53 (FIG. 3) to a position as best shown in FIG. 4 where the clamp bar 66 is angularly related to the uprights 53. In this condition of the clamp bar 66, it actuallly engages the top of the bale 76 as best shown in FIG. 4 and acts as a claw in holding the bale 76 downwardly againts the remainder of the bale-engaging unit 16.

After the bale 76 has been transported to the desired location, the cylinder 36 is again operated to move the bale-engaging unit 16 to the position of FIG. 3 wherein by moving the tractor 20 forwardly and away from the bale 76 it will then be left in the ground 77 at the desired location. Referring to FIG. 8, the preferred position of the transporter 10 is shown for transport position of the transporter 10 itself. Thus the forks 51 are not riding upon or engage the ground during transportion of the transporter 10 even without the bale 76.

A modification of the invention is shown by the use of dotted lines in FIG. 3. In certain instances, bales 76 are formed which are not right angular. For example, the dotted lines in the bale of FIG. 3 show sides extending upwardly and inwardly at approximately 80° from the horizontal — remembering that this is merely an example. To accommodate such a bale, the uprights 53 and the clamp bar 66 are disposed at approximately 80° to the horizontal.

This enables the stack or bale to nest between the forks 51 and the uprights 53, and furthermore particularly if the angle of the uprights 53 with the horizontal is slightly less than the angle of the sides, or front and rear of the bale with the horizontal, holding pressure or resistance of the uprights 53 at a point high on the side or end of the bale in engagement therewith is provided. Without such nesting, during transportation of the modified bale 76, it may break down and fall apart.

I claim:

1. Apparatus for transporting baled hay comprising:

frame means adapted to be connected to the drawbar of a prime mover;

crossbar means pivotally mounted to the rear of said frame means and including an elongated bar extending transversely and at right angles to the direction of movement of said apparatus;

ground engagable wheels secured to each end of said crossbar means in fixed angular relationship therewith, said ground engageable wheels each includes an arm fixedly secured to an end of said bar such that the angular relationship between said bar and each said arm remains the same at all times;

power means pivotally secured to and extended operatively between said frame means and said crossbar means and operable to pivot said crossbar means about said frame means between first and second positions; and bale engaging means secured to said crossbar means and extended rearwardly therefrom for engagement with baled hay, said bale engaging means operable in said crossbar means first position to lift the baled hay from a normally ground engaging position to a raised position for transporting, said bale engaging means lifting operation in response to the pivoting of said crossbar means to said second position.

2. Apparatus for transporting baled hay as described in claim 1 and further wherein said ground engageable wheels are mounted on an axis disposed forwardly of the transverse axis of said crossbar means so as to be disposed intermediate said transverse axis and the prime mover drawbar.

3. Apparatus for transporting baled hay as described in claim 1 and further wherein said bale engaging means includes:

fork means extended rearwardly of said crossbar means and adapted to engage the baled hay; and upright means mounted on said crossbar means and rotatable with said crossbar means, said upright means and said fork means angularly spaced apart and forming a cradle therebetween for holding the baled hay.

4. Apparatus for transporting baled hay as described in claim 3 and further wherein said fork means includes a plurality of transversally spaced elongated members adapted to rest flat upon the ground in one position of said crossbar means, said fork members movable in response to rotation of said crossbar means to an angular position relative to the ground.

5. Apparatus for transporting baled hay as described in claim 1 and further wherein means for clamping downwardly on the top of the baled hay engaged by said bale engaging means is provided, said clamping means mounted on said frame means and said crossbar means operable to move from an inoperative non-bale engaging position to an operative bale-engaging position in response to rotation of said crossbar means to said second position.

6. Apparatus for transporting baled hay as described in claim 5 and further wherein said clamping means includes an upright tubular member mounted on said crossbar means, an upright element telescopically mounted in the upper portion of said upright member, means connected to said tubular member and to said element and continually biasing said element downwardly within said member, a clamp pivotally connected to the exposed end of said element, and an actuating lever pivotally connected between said clamp and said frame means, said clamp movable in a vertical plane into engagement with the baled hay in response to rotation of said crossbar means to its second position.

* * * * *